(12) United States Patent
Grimm et al.

(10) Patent No.: US 10,675,827 B2
(45) Date of Patent: Jun. 9, 2020

(54) METHOD AND DEVICE FOR VULCANIZING TIRES

(71) Applicant: HARBURG-FREUDENBERGER MASCHINENBAU GMBH, Hamburg (DE)

(72) Inventors: Arnd Grimm, Stadthagen (DE); Jan Stellmacher, Hamburg (DE)

(73) Assignee: HARBURG-FREUDENBERGER MASCHINENBAU GMBH, Hamburg (DE)

( * ) Notice: Subject to any disclaimer, the term of this patent is extended or adjusted under 35 U.S.C. 154(b) by 0 days.

(21) Appl. No.: 16/328,137

(22) PCT Filed: Aug. 9, 2017

(86) PCT No.: PCT/DE2017/000252
§ 371 (c)(1),
(2) Date: Feb. 25, 2019

(87) PCT Pub. No.: WO2018/036575
PCT Pub. Date: Mar. 1, 2018

(65) Prior Publication Data
US 2019/0193357 A1 Jun. 27, 2019

(30) Foreign Application Priority Data
Aug. 25, 2016 (DE) .................. 10 2016 010 426

(51) Int. Cl.
*B29D 30/06* (2006.01)
*B29D 30/00* (2006.01)

(52) U.S. Cl.
CPC ...... *B29D 30/0645* (2013.01); *B29D 30/0603* (2013.01); *B29D 30/0643* (2013.01); *B29D 30/0016* (2013.01); *B29D 30/0654* (2013.01); *B29D 2030/0022* (2013.01); *B29D 2030/0027* (2013.01); *B29D 2030/0647* (2013.01); *B29D 2030/0659* (2013.01)

(58) Field of Classification Search
CPC ............ B29D 30/0016; B29D 30/0645; B29D 30/0654; B29D 2030/0022; B29D 2030/0027; B29D 2030/0647; B29D 2030/0659; B29D 2030/0666; B29D 30/0603
See application file for complete search history.

(56) References Cited

U.S. PATENT DOCUMENTS

| 1,456,425 A | 5/1923 | Demattia |
| 2,763,317 A | 9/1956 | Dixostling |
| 3,824,048 A * | 7/1974 | Getz ................. B29D 30/0016 425/28.1 |

(Continued)

FOREIGN PATENT DOCUMENTS

| DE | 1729860 A1 | 7/1971 |
| DE | 102006058685 A1 | 6/2008 |

(Continued)

*Primary Examiner* — James P Mackey
(74) *Attorney, Agent, or Firm* — Lucas & Mercanti, LLP; Klaus P. Stoffel

(57) ABSTRACT

A method and a device for vulcanizing tires. An expandable bellows is used for pressing the tire being vulcanized against segments of a mold. The bellows is arranged on a carrier which has an annular shape.

10 Claims, 4 Drawing Sheets

(56) References Cited

U.S. PATENT DOCUMENTS

| | | | | |
|---|---|---|---|---|
| 3,837,770 A | * | 9/1974 | Gazuit | B29D 30/0645 |
| | | | | 425/33 |
| 3,890,073 A | * | 6/1975 | Getz | B29D 30/0645 |
| | | | | 425/48 |
| 5,062,781 A | * | 11/1991 | Szyms | B29C 43/104 |
| | | | | 156/416 |
| 6,682,687 B1 | | 1/2004 | Mitamura et al. | |
| 7,740,462 B2 | * | 6/2010 | Ichimaru | B29D 30/0603 |
| | | | | 425/31 |
| 2002/0153638 A1 | | 10/2002 | Yu | |

FOREIGN PATENT DOCUMENTS

| | | |
|---|---|---|
| EP | 1090729 A2 | 4/2001 |
| WO | 2015165430 A1 | 11/2015 |

\* cited by examiner

METHOD AND DEVICE FOR VULCANIZING TIRES

CROSS-REFERENCE TO RELATED APPLICATIONS

The present application is a 371 of International application PCT/DE2017/000252, filed Aug. 9, 2017, which claims priority of DE 10 2016 010 426.0, filed Aug. 25, 2016, the priority of these applications is hereby claimed and these applications are incorporated herein by reference.

BACKGROUND OF THE INVENTION

The invention relates to a method for vulcanizing tires, in which the tire being vulcanized is placed in a mold in the area of a tire heating press and the mold is heated, and in which a heat transfer fluid is conducted into the area of the inner surface of the tire.

The invention further relates to a device for vulcanizing tires, comprising at least one heatable mold for the tire being vulcanized as well as a conduit device for a fluid intended for heat transfer, wherein the conduit device can be connected to a bellows.

Heating presses known thus far have a flexible inflatable cushion element as the bellows. The inflating is typically done with compressed air and/or hot steam. An internal pressure of the bellows during the vulcanization often lies in a range of 10 bar to 30 bar.

The bellows has a diameter similar to the outer diameter of the tire. The forces generated by the internal pressure are transmitted by the entire surface of the bellows onto the molds of the heating press and often require a closing pressure of several hundred metric tons. This results in the known very stable designs of heating presses and the consequent production costs.

Actually, only a small encircling ring portion of the circumference of the bellows situated on the outside in the radial direction is used to support the tire blank. For tires with a tread profile, this profile is produced by pressing into the mold. After the completion of the vulcanization process, an intermeshing of the tire tread with the mating profile of the mold therefore exists. This means that two-piece molds can only be used for tires with slight tread profiling. For larger tread profilings, the molds of the tire heating press are provided with segments able to move radially apart from each other, in order to eliminate the form fit created by the vulcanization.

One problem which the invention proposes to solve is to design a device such that the required closing forces of a tire heating press can be substantially reduced.

SUMMARY OF THE INVENTION

This problem is solved according to the invention in that no cushion-like bellows is used, but instead the bellows consists either of a radially encircling hose or a pressure pad which is radially clamped on both sides. The radially encircling pressure pad or the bellows extend radially around a rim-like inner structure. The inner region of this rim is pressureless and thus requires no closing forces.

The bellows is made from an elastic material, while the carrier structure consists of a firm material, such as metal.

Depending on the design realization, it is possible to reduce the closing forces and thus also the mechanical stability of the heating press to around ten percent. This results in significant reductions for the production costs.

Another problem which the invention proposes to solve is to define a method for tire production such that the required closing forces of a heating press are significantly reduced.

This problem is solved according to the invention in that a ring-shaped carrier for an expandable bellows is used.

The use of such a ring-shaped bellows with a rim-like carrier makes it possible to optimize the times for the loading and unloading of the heating press. At present, the loading systems and the unloading systems are often permanently assigned to a heating press. At least 80 percent of the process time is required to perform the vulcanization, only 20 percent for the loading and unloading. Thus, the systems for loading and unloading are inactive during the vulcanization process.

Another problem which the invention proposes to solve is therefore to design a method and a device such that the systems are optimized with respect to their loading and unloading time as well as the process time for performing the vulcanization.

This problem is solved according to the invention in that the unit consisting of bellows and carrier is designed to be transportable in one advantageous embodiment and the tire can be vulcanized on the bellows ring system as a mobile component of a heating press.

In a design of bellows and carrier as a transportable unit, it is possible to assign one common placement device, which arranges a corresponding green tire on the carrier with the bellows, to several heating presses. Likewise, one common unloading system can be realized for finished vulcanized tires with a return of the unit consisting of bellows and carrier.

In the area of the heating press, a fully automatic performance or possibility of performing the loading, unloading and vulcanization is considered for one advantageous embodiment of the method of the invention and the device of the invention.

The method according to the invention serves for the production of vehicle tires with a circulating bellows ring system (COR) of the heating press. Primarily the method is intended for two-wheel tires, such as those of bicycles, motorcycles or scooters. Yet an application in other areas is also conceivable, such as production of car or truck tires.

Tire blanks are highly unstable in shape and cannot be easily handled with known techniques. Therefore, according to the invention, a bellows ring system is used, which can be utilized in a functional unit for shaping, transporting, vulcanizing, further transporting, and stripping from the mold.

The bellows ring system according to the Invention is used in a circuit in one advantageous embodiment of the method of the invention. An operator watches over the circuit and manually places the blank around the bellows ring system. Alternatively, an automated placement of the blank on the bellows ring system is also possible. At each processing station, the bellows ring system can be connected to the necessary medium (air, vulcanizing medium (steam/N2/hot water), vacuum). The transporting of the blank on the bellows ring system can be done with air as the medium.

Benefits of the method and the device according to the invention, in addition to the improved performance of the mentioned technical tasks, are a more gentle handling of the tire blank, compliance with safety rules by greater distances of workers from dangerous movements, elimination of the need for manual interventions in the process, especially as regards the production of two-wheel tires, the possibility of a direct quality control by the operator at the end of the process and thus avoidance of further rejects during the later quality assurance, and the ability to combine bellows ring systems for other tire sizes.

BRIEF DESCRIPTION OF THE DRAWING

The method and the device according to the invention shall be explained in the following in an exemplary embodiment. There are shown.

DETAILED DESCRIPTION OF THE INVENTION

Figure 1:
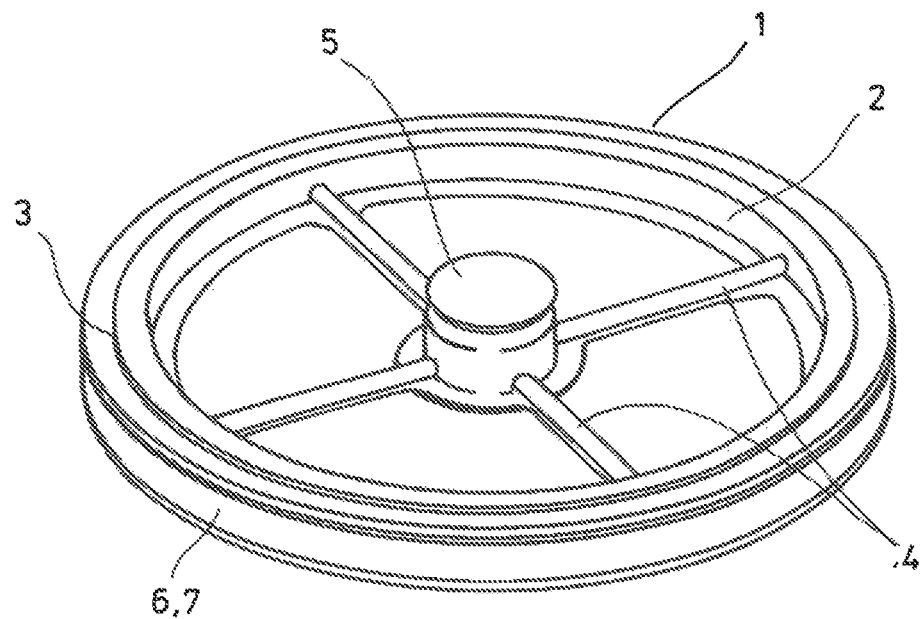
FIG. 1, a perspective view of a bellows ring system according to the invention, FIG. 2, a cross section of the bellows ring system according to the invention, FIG. 3, a representation of the circuit of the method according to the invention, FIG. 4, a representation of the loading step of the method according to the invention, FIG. 5, a representation of the transport step of the method according to the invention, FIG. 6, a representation of the vulcanization step of the method according to the invention, FIG. 7, a representation of the transport step of the method according to the invention after the vulcanization process, and FIG. 8, a representation of the unloading step of the method according to the invention.

FIG. 1 shows a perspective representation of one advantageous embodiment of the bellows ring system (1) according to the invention. The rim-like carrier structure (2) consists of a ring (3), which is connected to a middle piece (5) by means of four spoke-like struts (4). At its outer side, the ring (2) has an encircling groove (6), in which the bellows (7) is situated in a contracted state.

Figure 2:
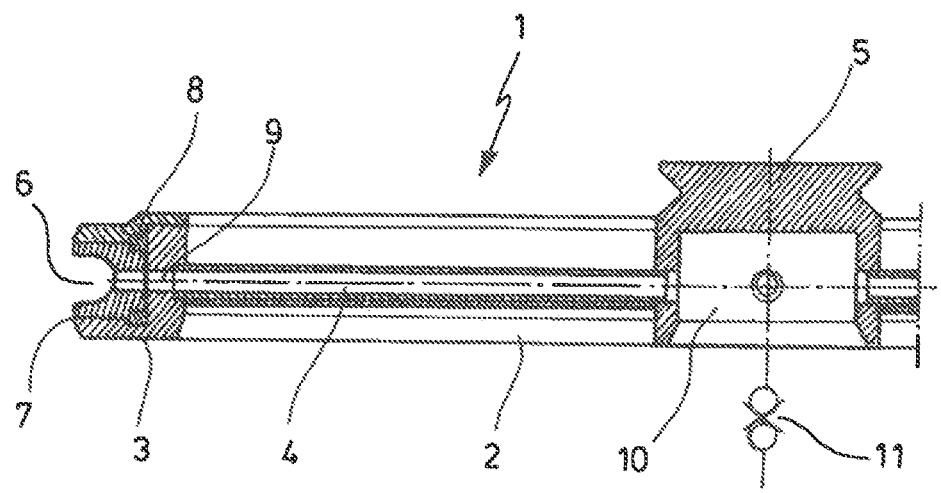

FIG. 2 shows a cross section through the embodiment of the bellows ring system (1) according to the invention as shown in FIG. 1. The bellows (7) lies in the encircling groove (6) and is fastened to the ring (3) with the aid of a fastening structure (8). The struts (4) are tubular in design, so that they connect a cavity (9) in the ring (3) to a cavity (10) in the middle piece (5). By the conduit system defined in this way, the medium required for a process step can be taken via a connection piece (11) through the carrier to the bellows (7). The bellows (7) can be expanded with the help of an excess pressure in the conduit system, and the bellows (7) can be contracted and lowered in the groove (6) by a partial vacuum or a vacuum. The conduit system must have a tightness suitable to the needs of the tire heating press.

It is also contemplated to separate the ring (3) of the carrier (2) into an upper and a lower part, whose spacing can be adjusted for example by threaded rods, in order to facilitate the loading and unloading process of the bellows ring system (1).

Figure 3:
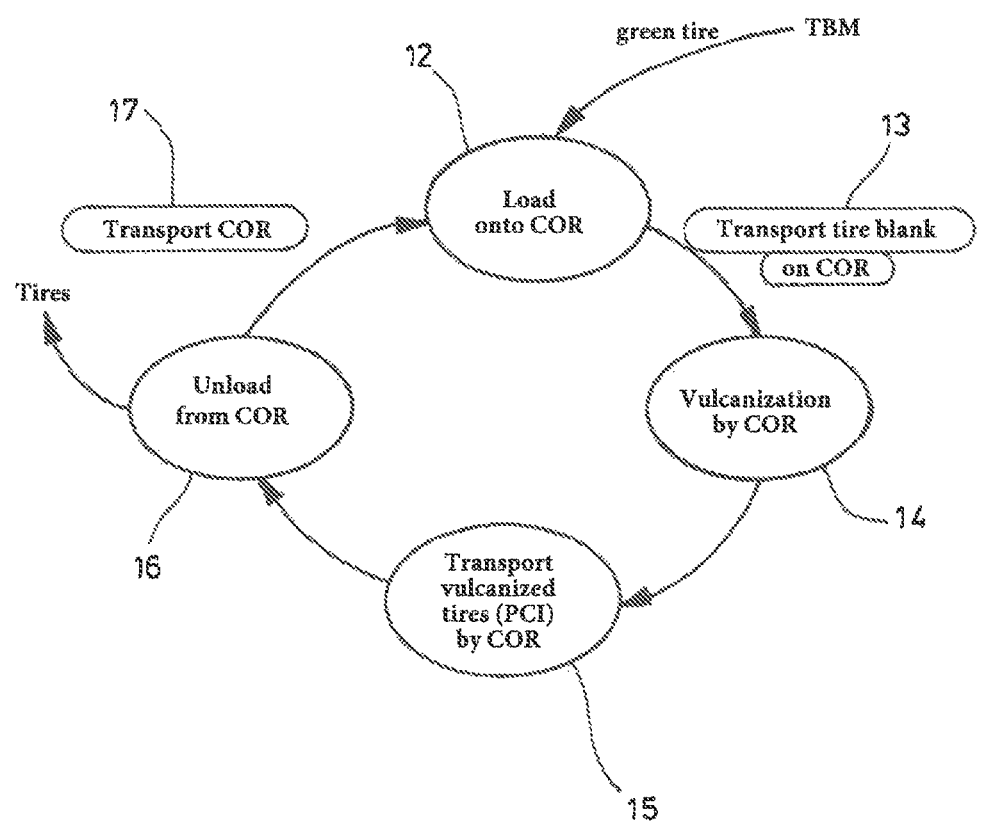

FIG. 3 shows one advantageous embodiment of the vulcanization method according to the invention as a circuit. In the first step (12), the green tire (18) arriving from the tire building machine (TBM) is loaded onto the bellows ring system (1) according to the invention of a heating press. Step two (13) is the transport of the tire blank on the bellows ring system (1) to the vulcanization step (14), in which the vulcanization of the tire is done in a heating press. In a following step (15), the vulcanized tire on the bellows ring system (1) is transported to the unloading step (16). In this step (15), the tire in one advantageous embodiment of the method according to the invention is expanded by means of compressed air from the inside after the vulcanization on the bellows ring system (1) (post-cure inflation, PCI). The PCI is a device for compressed air supporting of the vulcanized tire after its removal from the mold of the heating press. Alternatively, the vulcanized tire can also be transported on the bellows ring system (1) without the PCI step (15) to the unloading step (16). In the unloading step (16), the tire is unloaded from the bellows ring system (1). After this comes a further transport step (17) of the bellows ring system (1), now without the tire, in order to be able to once more commence the loading step (12) in the circuit of the depicted embodiment of the method according to the invention.

Figure 4:
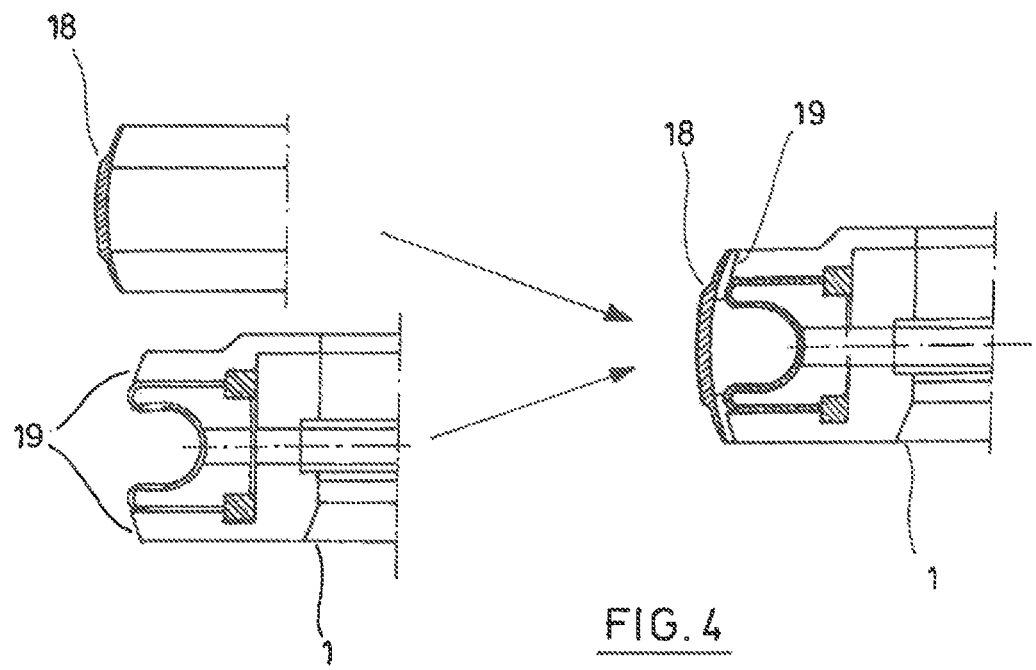

FIG. 4 shows schematically the loading (12) of the bellows ring system (1) according to the invention. The green tire (18) is pulled onto the bellows ring system (1) and straightened out. The middle of the tread of the green tire (18) should be positioned centrally on the bellows ring system (1). The outer contour of the bellows ring system (1) in the advantageous embodiment shown favors the straightening of the green tire (18) by a tapering (18) at the top and bottom.

Figure 5:
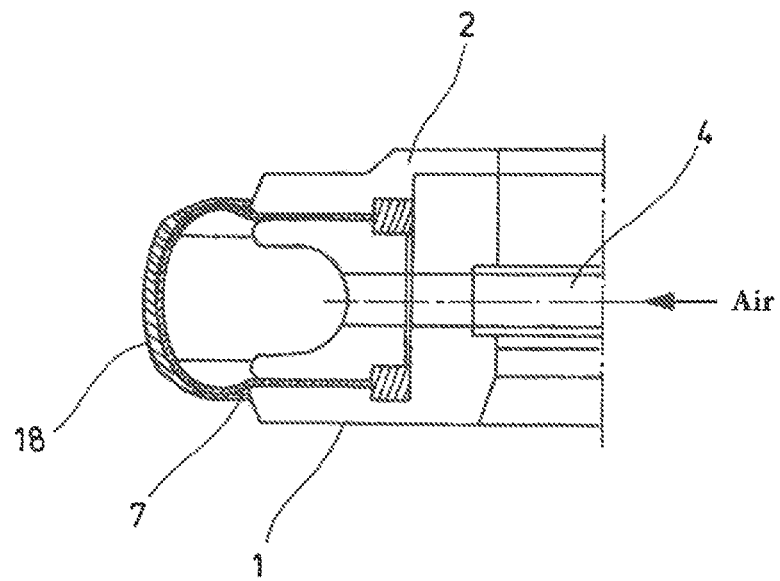

FIG. 5 shows the bellows ring system (1) according to the invention loaded with a green tire (18) and being transported in a transport step (13). During the transport step (13), a preshaping of the tire blank (18) is made possible in that the bellows (7) of the bellows ring system (1) is expandable. In addition to the preshaping, an expanded bellows (7) secures the green tire (18) during the transport on the bellows ring system (1). In one advantageous embodiment of the method according to the invention, air as the medium with a pressure of 1 bar to 10 bar and a temperature of 10° C. to 100° C. is pumped into the bellows ring system (1). In an especially advantageous embodiment of the method according to the invention, a pressure of 3 bar to 7 bar and a temperature between 20° C. and 50° C. is used for the process step (13).

Figure 6:
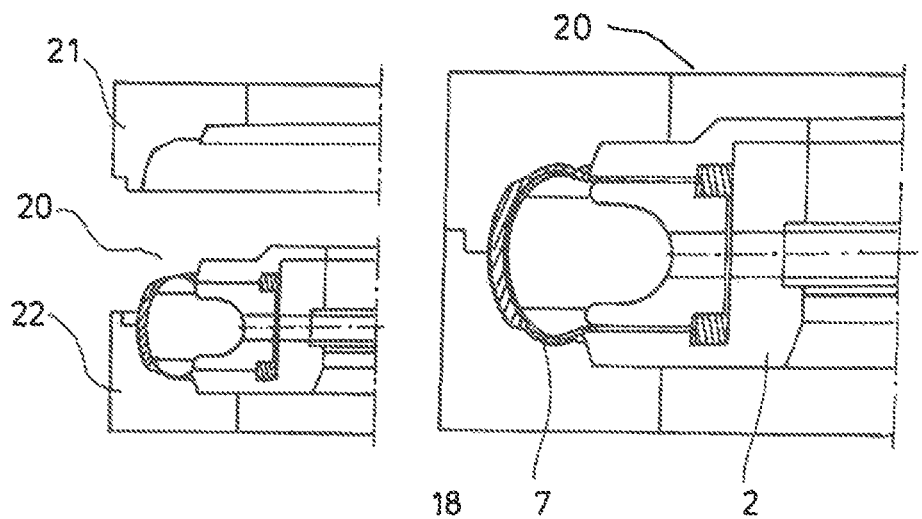

FIG. 6 shows schematically the vulcanization step (14) and the vulcanization device (20), The vulcanization device (20) comprises, besides the bellows ring system (1), at least one upper (21) and one lower mold (22), producing the outer profile of the tire. In order to generate the temperatures needed for the vulcanization process, a heated vulcanization medium under an excess pressure can be introduced into the bellows (7) via the connection piece (11). The creating of the required temperature and the required pressure can occur in a portion of the heating press (20) not shown.

The vulcanization step (14) involves the positioning of the bellows ring system (1) according to the invention with a tire blank (18) in a tire heating press (20), the connecting of the connection piece (11) to the circuit of the vulcanization medium, the closing of the molds (21, 22) of the tire heating press (20), the molding of the tire blank (18) by a medium supplied with excess pressure to the bellows (7) and the vulcanization of the green tire (18) by appropriate furnishing of heat with the aid of the vulcanization medium. The pressure in one advantageous embodiment of the method according to the invention lies in a range of 10 bar to 30 bar and the temperature is between 100° C. and 200° C.

One especially advantageous embodiment of the method uses a pressure between 15 bar and 25 bar and a temperature between 120° C. and 180° C. for the vulcanization medium. After the end of the vulcanization process proper, pressure and temperature of the medium in the bellows (7) are reduced and the molds (21, 22) of the heating press (20) are opened.

Figure 7:
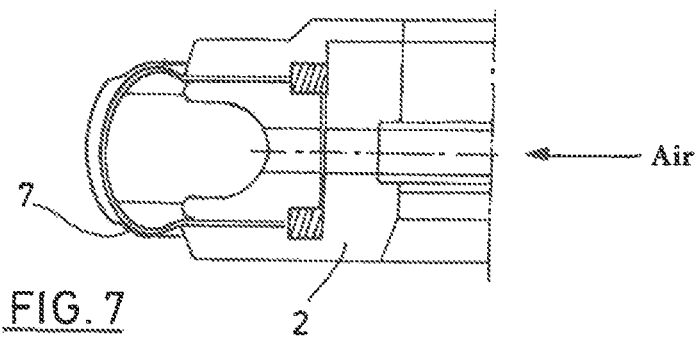

FIG. 7 shows the bellows ring system (1) according to the invention in the transport step (15) with PCI of the method according to the invention. After the vulcanization of the tire, air is pumped with excess pressure into the bellows (7) in order to secure the tire and its shape. Pressure and temperature in this process step (15) in one advantageous embodiment correspond to the values mentioned in the step "transport of the green tire" (13).

Figure 8:
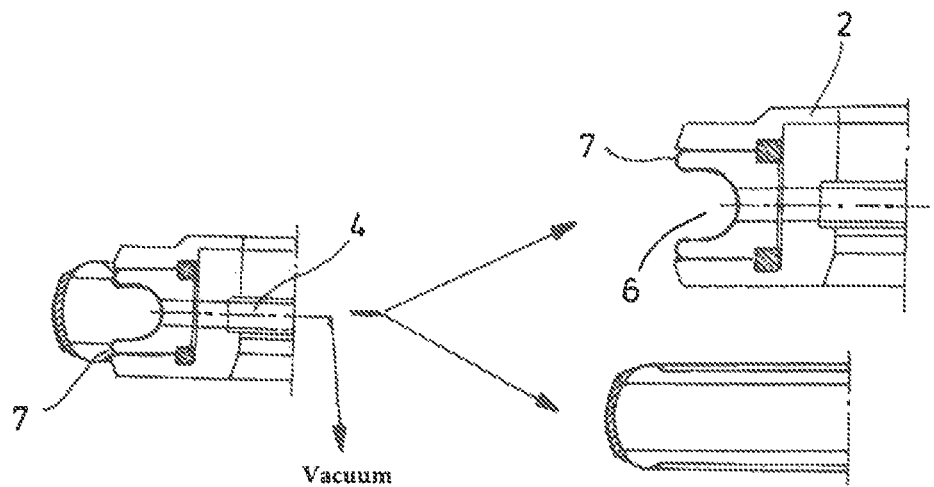

FIG. 8 shows the bellows ring system (1) according to the invention in the unloading step (16). The unloading step (16) involves the pumping out of medium located in the bellows ring system (1), for example with air possibly pumped into the bellows ring system (1) in the transport step with PCI (15), so that the bellows (7) contracts due to a partial vacuum and is finally drawn into the encircling groove (6) of the bellows ring system (1) and releases the tire. The tire and the bellows ring system (1) are then separated.

With the aid of the method and the device according to the invention a significantly more efficient utilization of the energy in the form of pressure and heat, especially as required in the vulcanization process, and a more efficient utilization of the resources required in tire production, such as the rest of the tire heating press, can thus be realized. Furthermore, the instability in the shape of the tire blanks is prevented by their transport on the bellows ring system (1) according to the invention.

The invention claimed is:

1. A method for vulcanizing tires, comprising the steps of: placing a tire in a mold in an area of a tire heating press and heating the mold; conducting a heat transfer fluid into an area of an inner surface of the tire; and carrying an expandable bellows on a carrier having an annular shape, the fluid being conducted into the bellows, wherein the bellows and the carrier are part of a bellows ring system, the method further including the steps of: loading a green tire onto the bellows ring system; transporting the green tire on the bellows ring system; vulcanizing the tire on the bellows ring system; transporting the vulcanized tire on the bellows ring system; unloading the vulcanized tire from the bellows ring system; and transporting the bellows ring system without the tire.

2. The method for vulcanizing tires according to claim 1, wherein the bellows ring system is a mobile component of the tire heating press, the method including transporting the tire on the bellows ring system in a production process and vulcanizing the tire on the bellows ring system.

3. The method for vulcanizing tires according to claim 1, wherein the individual steps of the method together form a circuit.

4. The method for vulcanizing tires according to claim 1, including expanding the bellows of the bellows ring system during the transport of the green tire and/or the vulcanized tire.

5. The method for vulcanizing tires according to claim 2, including, for at least one step of the method, pumping the fluid under a pressure between 1 bar and 30 bar and with a temperature between 10° C. and 200° C. into or out from the bellows ring system.

6. The method according to claim 1, including conducting the fluid radially from a center hub of the bellows ring system to the annular carrier.

7. A device for vulcanizing tires, comprising: at least one heatable mold for a tire being vulcanized; an expandable bellows; a conduit device for a fluid intended for heat transfer, wherein the conduit device is connectable to the bellows; and a carrier for the expandable bellows, the carrier having an annular shape, wherein the bellows and the carrier form a bellows ring system on which the tire can be vulcanized and transported before and after being vulcanized.

8. The device for vulcanizing tires according to claim 7, further comprising a tire heating press, wherein the bellows ring system is a component of the tire heating press.

9. The device for vulcanizing tires according to claim 7, wherein the bellows ring system includes a center hub, wherein the conduit device includes an interior conduit structure for the fluid in the bellows ring system, leading from a connection piece to the bellows, the conduit structure including tubular struts that extend radially from the center hub to the annular carrier.

10. The device for vulcanizing tires according to claim 9, wherein the bellows is expandable or contractible by supply or removal of the fluid and wherein the fluid in the bellows at least partially supplies a temperature needed for the vulcanization of the tire.

* * * * *